(12) United States Patent
Luo

(10) Patent No.: US 12,199,471 B2
(45) Date of Patent: Jan. 14, 2025

(54) OIL-COOLED MOTOR

(71) Applicant: Xiaomi EV Technology Co., Ltd., Beijing (CN)

(72) Inventor: Wenhui Luo, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 248 days.

(21) Appl. No.: 17/877,459

(22) Filed: Jul. 29, 2022

(65) Prior Publication Data

US 2023/0307968 A1    Sep. 28, 2023

(30) Foreign Application Priority Data

Mar. 28, 2022  (CN) .......................... 202210316327.4

(51) Int. Cl.
  *H02K 1/20*  (2006.01)
  *H02K 5/20*  (2006.01)
  (Continued)

(52) U.S. Cl.
  CPC ............... *H02K 1/20* (2013.01); *H02K 5/203* (2021.01); *H02K 9/00* (2013.01); *H02K 9/19* (2013.01)

(58) Field of Classification Search
  CPC ............ H02K 9/19; H02K 1/32; H02K 5/203; H02K 1/20; H02K 7/003; H02K 5/20;
  (Continued)

(56) References Cited

U.S. PATENT DOCUMENTS

2010/0277016 A1* 11/2010 Dang .................. H02K 1/20
                                                    310/54
2011/0221286 A1*  9/2011 Uchiyama ............ H02K 1/20
                                                    310/54
(Continued)

FOREIGN PATENT DOCUMENTS

CN    204906112 U    12/2015
CN    108370180 A     8/2018
(Continued)

OTHER PUBLICATIONS

Arai et al, Cooler of Motor, Feb. 2, 2006, JP 2006033916 (English Machine Translation) (Year: 2006).*
(Continued)

*Primary Examiner* — Alexander A Singh
(74) *Attorney, Agent, or Firm* — Volpe Koenig

(57) ABSTRACT

An oil-cooled motor includes a casing, a rotor, and a stator. The casing is internally provided with an accommodating cavity. The rotor and the stator are accommodated in the accommodating cavity. The stator includes a stator core coaxially surrounding an outer side of the rotor. The stator core includes a first oil cooling channel, a second oil cooling channel, and a first end and a second end in an axial direction of the rotor. The first oil cooling channel penetrates the stator core from the first end to the second end, forming a first oil inlet in the first end and forming a first oil outlet in the second end. The second oil cooling channel penetrates the stator core from the first end to the second end, forming a second oil inlet in the second end and forming a second oil outlet in the first end.

19 Claims, 9 Drawing Sheets

(51) Int. Cl.
  *H02K 9/00* (2006.01)
  *H02K 9/19* (2006.01)
(58) Field of Classification Search
  CPC .. H02K 9/00; H02K 9/02; H02K 9/04; H02K 9/06; H02K 9/08; H02K 9/10; H02K 9/12; H02K 9/14; H02K 9/16; H02K 9/18; H02K 9/193; H02K 9/197; H02K 9/22; H02K 9/223; H02K 9/225; H02K 9/227; Y02T 10/64
  USPC .................. 310/52, 53, 54, 58, 61, 60 A, 64
  See application file for complete search history.

(56) References Cited

U.S. PATENT DOCUMENTS

2018/0054107 A1* 2/2018 Leonardi ................. H02K 9/193
2019/0157923 A1* 5/2019 Morgante ................. H02K 1/20
2021/0281134 A1* 9/2021 Lux ......................... H02K 21/14

FOREIGN PATENT DOCUMENTS

| CN | 112615445 A | 4/2021 |
| CN | 113206563 A | 8/2021 |
| CN | 113381531 A | 9/2021 |
| DE | 10019914 A1 | 2/2001 |
| DE | 102015215762 A1 | 2/2017 |
| DE | 102016222331 A1 | 5/2018 |
| EP | 1953896 A1 | 8/2008 |
| JP | 2006033916 A * | 2/2006 |
| JP | 2010-263715 A | 11/2010 |
| WO | 2014/032876 A2 | 3/2014 |
| WO | 2022/001268 A1 | 1/2022 |

OTHER PUBLICATIONS

Extended European Search Report issued on Oct. 12, 2023 for European Patent Application No. 22187687.3.

* cited by examiner

OIL-COOLED MOTOR

CROSS REFERENCE TO RELATED APPLICATIONS

The present application claims the benefit of priority to Chinese Patent Application No. 202210316327.4, filed on Mar. 28, 2022, the contents of which are incorporated by reference in their entireties for all purposes.

BACKGROUND

Taking a drive motor of a new energy vehicle as an example, the higher the rotational speed, torque density and power density of the motor, the higher the heat generated. Thus, a heat dissipation and cooling structure of the motor is essential for the reliable, stable and efficient operation of the motor. Motor cooling may be divided into air cooling, water cooling, and oil cooling. Oil cooling is becoming the first choice for high-performance motor cooling solutions due to characteristics of natural electrical insulation and high degree of freedom in structural design.

Most drive motors of new energy vehicles are permanent magnet synchronous motors. When a motor is running in a medium and low speed area, stator components of the motor generate a lot of heat among which the main heat is generated by a stator winding and a stator core. When the motor is running in a high-speed area, heat generated by the rotor components of the motor increases sharply. In this way, if the stator components or rotor components of the drive motor cannot be effectively cooled, the overall performance of the motor may be directly affected, resulting in low reliability, stability and efficiency of motor operation, and seriously affecting the reliable and stable operation of the vehicle.

SUMMARY

The present application relates to the technical field of motor cooling, and relates to an oil-cooled motor.

The present application provides an oil-cooled motor, including:
a casing, internally provided with an accommodating cavity;
a rotor, accommodated in the accommodating cavity; and
a stator, accommodated in the accommodating cavity; the stator includes a stator core coaxially surrounding an outer side of the rotor, the stator core includes a first oil cooling channel, a second oil cooling channel, and a first end and a second end in an axial direction of the rotor, the first oil cooling channel penetrates the stator core from the first end to the second end, forming a first oil inlet in the first end and forming a first oil outlet in the second end, and the second oil cooling channel penetrates the stator core from the first end to the second end, forming a second oil inlet in the second end and forming a second oil outlet in the first end.

DETAILED DESCRIPTION

Examples will be described in detail here, instances of which are illustrated in the accompanying drawings. When the following description refers to the accompanying drawings, unless otherwise indicated, the same numbers in different drawings indicate the same or similar elements. The implementations described in the following examples do not represent all implementations consistent with the present application. Rather, they are merely instances of apparatuses and methods consistent with some aspects of the present application.

The terms used in the present application are merely for the purpose of describing specific examples, and not intended to limit the present application. Unless otherwise defined, technical or scientific terms used in the present application shall have the ordinary meanings understood by those ordinarily skilled in the art to which the present application pertains. The words "first", "second" and the like used in the present application do not indicate any order, quantity or importance, but are merely used to distinguish different components. As such, nor "one" or "a" or similar words indicate quantity limitations, but indicate at least one, and will be specified separately if they mean merely "one". "A plurality of" or "several" means two or more. Unless otherwise indicated, the terms "front," "rear," "lower," and/or "upper," "top," "bottom," and the like are for convenience of description and are not limited to one position or one spatial orientation. The words "comprise" or "include" or the like indicate that an element or item appearing before "comprise" or "include" covers listed elements or items appearing after "comprise" or "include" and their equivalents, and do not exclude other elements or items. The words "connecting" or "connected" or the like are not limited to physical or mechanical connection, but may include electrical connection, whether direct or indirect.

The present application provides an oil-cooled motor, which is able to effectively cool a stator of the motor.

Figure 1:
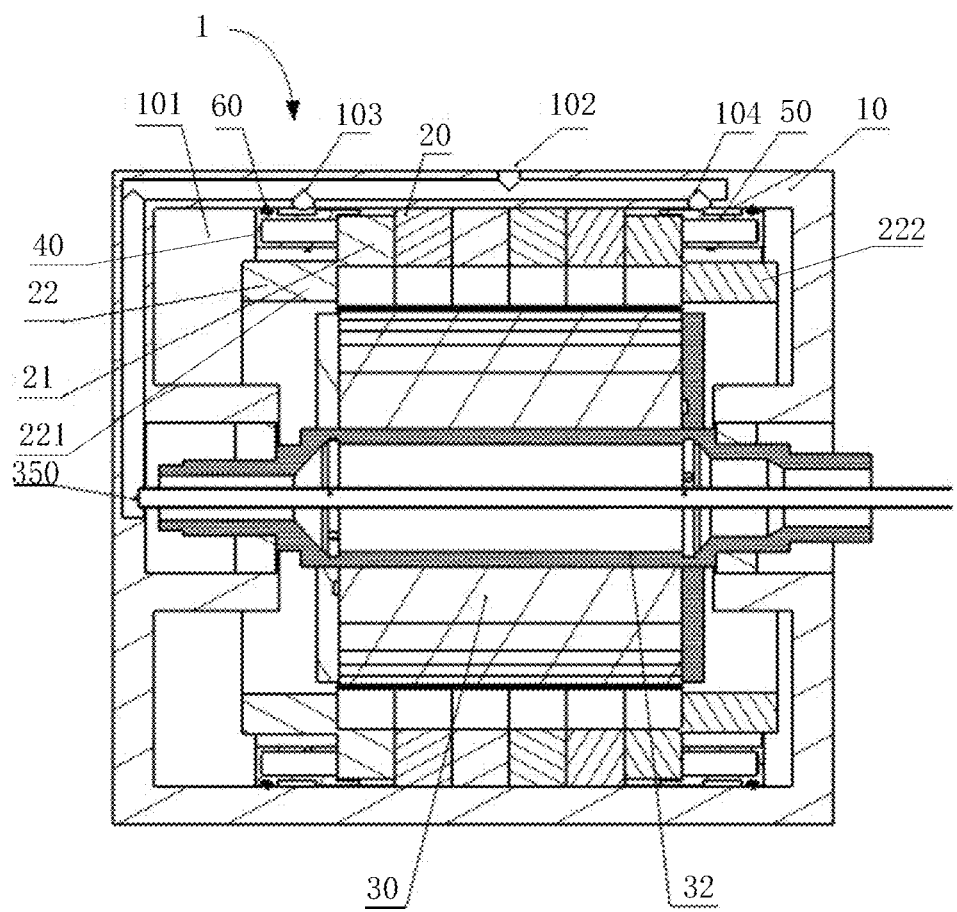
FIG. 1 is a cross-sectional view of a motor illustrated by an example of the present application.

Please refer to FIG. 1 which illustrates a cross-sectional view of an oil-cooled motor 1 illustrated by an example of the present application.

The oil-cooled motor 1 provided by an example of the present application includes a casing 10, a stator 20, and a rotor 30. The casing 10 is internally provided with an accommodating cavity 101. The stator 20 and the rotor 30 are accommodated in the accommodating cavity 101, and are disposed coaxially. The stator 20 and the casing 10 are relatively fixed. The rotor 30 is rotatable relative to the stator 20. The stator 20 is disposed surrounding an outer side of the rotor 30.

The stator 20 includes a stator core 21 and a stator winding 22 assembled to the stator core 21. The stator core 21 is of a hollow columnar structure, and the rotor 30 is assembled in a hollow portion of the stator core 21. An axial line of the stator core 21 and an axial line of the rotor 30 are collinear. The oil-cooled motor 1 is capable of cooling the stator core 21 and the stator winding 22 via oil.

In one example, the casing 10 is provided with a casing oil inlet 102, a first stator oil inlet 103, and a second stator oil inlet 104. The casing oil inlet 102 communicates with the first stator oil inlet 103, and further communicates with the second stator oil inlet 104. The first stator oil inlet 103 inputs cooling oil into the stator core 21 from a first end 212 of the stator core 21, and the second stator oil inlet 104 inputs cooling oil into the stator core 21 from a second end 213 of the stator core 21, so that oil may be fed from both ends of the stator core 21 simultaneously.

Figure 2:
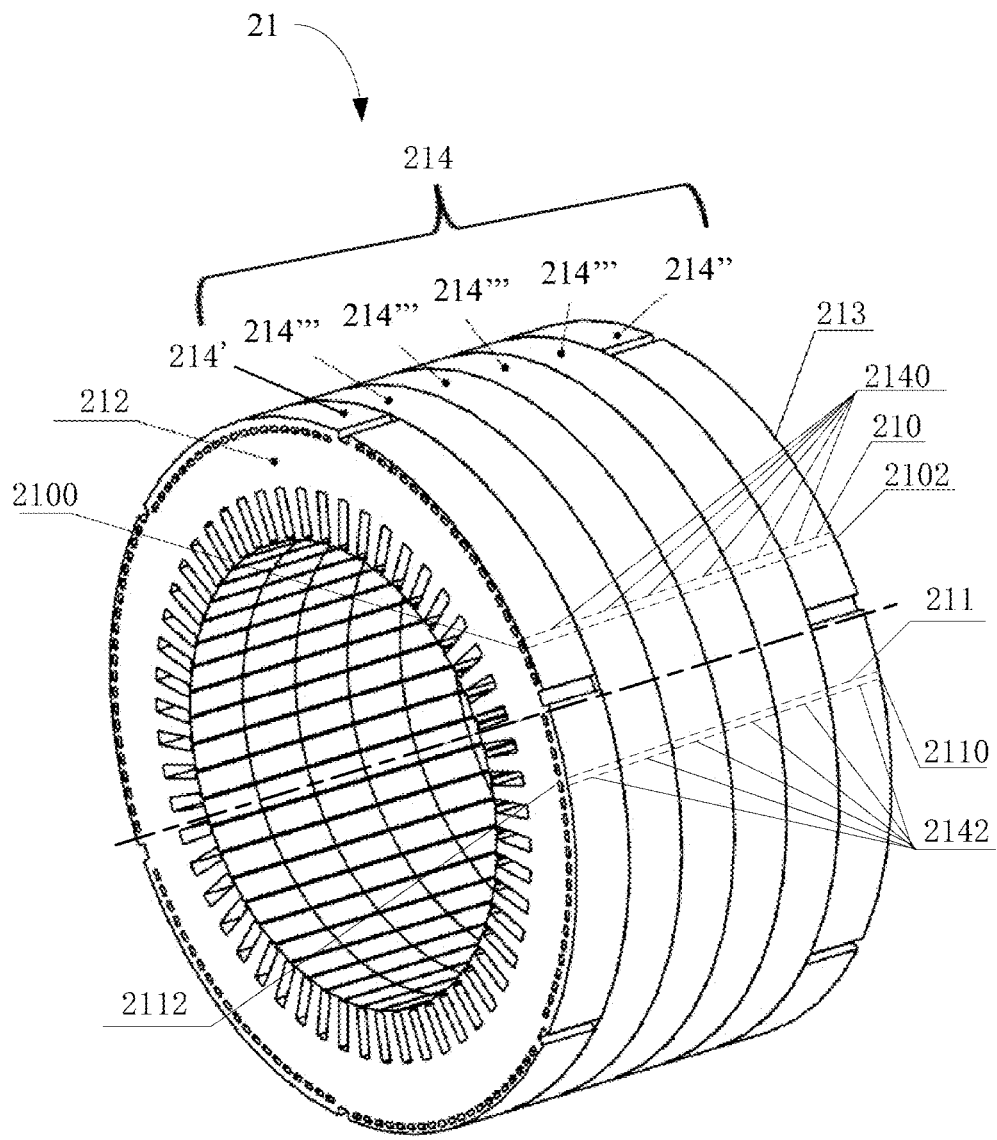
FIG. 2 is a schematic diagram of a stator core illustrated by an example of the present application.

Please refer to FIG. 2 which is a schematic diagram of the stator core 21 illustrated by an example.

The stator core 21 includes a first oil cooling channel 210, a second oil cooling channel 211, and the first end 212 and the second end 213 in an axial direction of the rotor 30. The first oil cooling channel 210 penetrates the stator core 21 from the first end 212 to the second end 213, forming a first oil inlet 2100 in the first end 212 and forming a first oil outlet 2102 in the second end 213. The first oil inlet 2100 allows oil to flow in, and the first oil outlet 2102 allows oil to flow out. The second oil cooling channel 211 penetrates the stator core 21 from the first end 212 to the second end 213, forming a second oil inlet 2110 in the second end 213 and forming a second oil outlet 2112 in the first end 212. The second oil inlet 2110 allows oil to flow in, and the second oil outlet 2112 allows oil to flow out. With this arrangement, oil may be transported into the stator core 21 from both axial ends of the stator core 21 respectively, and the oil may exchange heat with the stator core 21 to dissipate heat for the stator core 21. Moreover, a manner of supplying oil from both ends of the stator core 21 is able to achieve uniform heat dissipation, improve the heat dissipation efficiency and enhance the heat dissipation effect compared with a manner of supplying oil from one side.

By means of the technical solutions provided by the present application, at least the following beneficial effects are able to be achieved:

The present application provides an oil-cooled motor. The stator core includes the first oil cooling channel 210 and the second oil cooling channel 211, the first oil cooling channel 210 forms the first oil inlet 2100 in the first end 212 of the stator core 21, and the second oil cooling channel 211 forms the second oil inlet 2110 in the second end 213 of the stator core 21, so that oil may be fed to the stator core 21 from two sides. Thus, a heat dissipation area is increased, uniform heat dissipation is achieved, and heat dissipation efficiency is improved.

In one example, the stator core 21 may include a plurality of first oil cooling channels 210 disposed in parallel. Correspondingly, the plurality of first oil cooling channels 210 form a plurality of first oil inlets 2100 in the first end 212, and form a plurality of first oil outlets 2102 in the second end 213. The plurality of first oil inlets 2100 communicate with the plurality of first oil outlets 2102 in one-to-one correspondence, so that a heat dissipation area can be increased, and uniformity of heat dissipation can be further improved.

A distribution manner of the plurality of first oil inlets 2100 is not specifically limited in the present application, and may be selected and set according to actual needs. In the example, the plurality of first oil inlets 2100 are disposed in groups in a circumferential direction of the stator core 21 at the first end 212, and each group includes a plurality of first oil inlets 2100. The plurality of first oil outlets 2102 are disposed in groups in the circumferential direction of the stator core 21 at the second end 213, and each group includes a plurality of first oil outlets 2102. In this way, heat dissipation can be achieved at 360° in the circumferential direction of the stator core 21.

The "circumferential direction of the stator core" refers to a circumferential direction around the axial line of the rotor 30. Unless otherwise specified, the same expressions hereinafter have the same meanings.

In the example shown in FIG. 2, the plurality of first oil inlets 2100 in each group and the plurality of first oil outlets 2102 in each group are opposite one to one in the axial direction of the stator core 21, so that the first oil cooling channel 210 may be formed as an oil cooling channel of a straight-through structure. In some other examples, the plurality of first oil inlets 2100 in each group and the plurality of first oil outlets 2102 in each group are staggered in the circumferential direction of the stator core 21, so that the first oil cooling channel 210 may be formed as an oil cooling channel of a spiral structure.

In one example, the plurality of first oil inlets 2100 in each group are arranged in the circumferential direction of the stator core 21, and have the same quantity, shape and size. The plurality of first oil outlets 2102 in each group are arranged in the circumferential direction of the stator core 21, and have the same quantity, shape and size. In this example, both the first oil inlets 2100 and the first oil outlets 2102 are set as square openings, and opening areas of the first oil inlets 2100 and the first oil outlets 2102 are equal. In other examples, both the first oil inlets 2100 and the first oil outlets 2102 may be set as round openings, and diameters of the first oil inlets 2100 and the first oil outlets 2102 are equal, but are not limited to this.

The stator core 21 may further include a plurality of second oil cooling channels 211 disposed in parallel. The plurality of second oil cooling channels 211 form a plurality of second oil inlets 2110 in the second end 213, and form a plurality of second oil outlets 2112 in the first end 212. The plurality of second oil inlets 2110 communicate with the plurality of second oil outlets 2112 in one-to-one correspondence. In addition, the plurality of second oil inlets 2110 are disposed in groups in the circumferential direction of the stator core 21 at the second end 213, and each group includes a plurality of second oil inlets 2110. The plurality of second oil outlets 2112 are disposed in groups in the circumferential direction of the stator core 21 at the first end 212, and each group includes a plurality of second oil outlets 2112. The plurality of second oil inlets 2110 in each group and the plurality of second oil outlets 2112 in each group are opposite one to one in the axial direction of the stator core 21, so that the second oil cooling channel 211 may be formed as a straight-through oil cooling channel. In some other examples, the plurality of second oil inlets 2110 in each group and the plurality of second oil outlets 2112 in each group are staggered in the circumferential direction of the stator core 21, so that the second oil cooling channel 211 may be formed as a spiral oil cooling channel.

In one example, the plurality of second oil inlets 2110 in each group are arranged in the circumferential direction of the stator core 21, and each of second oil inlets 2110 can have the same quantity, shape and size as the others. The plurality of second oil outlets 2112 in each group are arranged in the circumferential direction of the stator core 21, and each can have the same quantity, shape and size as the others. In this example, both the second oil inlets 2110 and the second oil outlets 2112 are set as square openings, and opening areas of the second oil inlets 2110 and the second oil outlets 2112 are equal. In other examples, both the second oil inlets 2110 and the second oil outlets 2112 may be set as round openings, and diameters of the second oil inlets 2110 and the second oil outlets 2112 are equal.

Please continue to refer to FIG. 2, the stator core 21 includes a plurality of lamination stacks 214 stacked in the axial direction, and each lamination stack 214 is formed by stacking a plurality of laminations in a thickness direction. The quantity of laminations in each lamination stack 214 is not limited, and may be selected and set according to actual needs. Laminations in the same lamination stack 214 may be provided as the same laminations.

Each lamination stack 214 is provided with first oil passage holes 2140 extending axially therethrough and second oil passage holes 2142 extending axially therethrough. The first oil passage holes 2140 of the plurality of lamination stacks 214 communicate with one another in sequence to form the first oil cooling channel 210. The second oil passage holes 2142 of the plurality of lamination stacks 214 communicate with one another in sequence to form the second oil cooling channel 211. In one example, the first oil passage holes 2140 in each lamination stack 214 are arranged to form a structure that runs straight-through in an axial direction, and the first oil passage holes 2140 of the plurality of lamination stacks 214 are arranged to form a structure that runs straight through in an axial direction to form the first oil cooling channel 210 of the straight-through structure. Similarly, the second oil passage holes 2142 in each lamination stack 214 are arranged to form a structure that runs straight-through in an axial direction, and the second oil passage holes 2142 of the plurality of lamination stacks 214 are arranged to form a structure that runs straight through in an axial direction to form the second oil cooling channel 211 of the straight-through structure, but examples are not limited to this structure.

Figure 3:
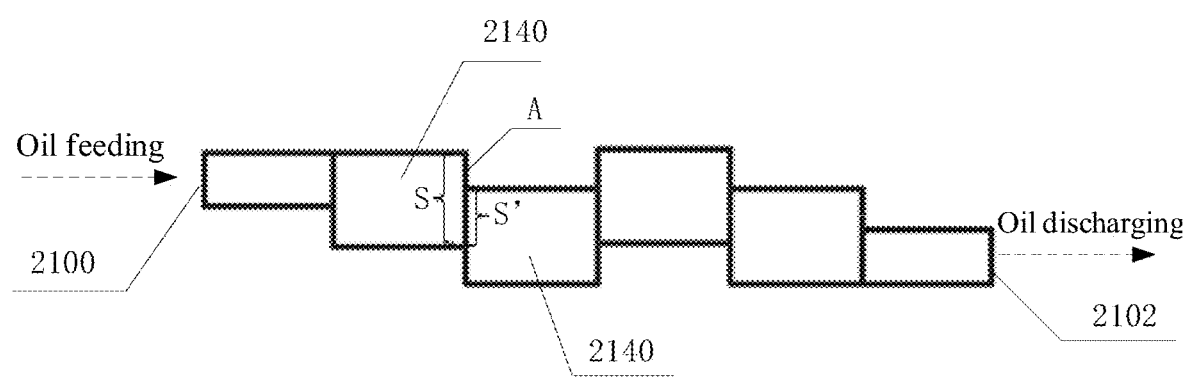
FIG. 3 is a schematic diagram of communication of first oil passage holes of each lamination stack of a stator core.

Please refer to FIG. 3 which illustrates a schematic diagram of communication of the first oil passage holes 2140 of each lamination stack 214.

In this example, a contact area between oil in the first oil cooling channel 210 (shown in FIG. 2) and the lamination stacks 214 (shown in FIG. 2) may be increased by changing an area of a communication position of two first oil passage holes 2140 of two adjacent lamination stacks 214. Specifically, in at least two adjacent lamination stacks 214, a flow area S of the first oil passage hole 2140 of the lamination stack 214 close to the first oil inlet 2100 is larger than a communication area S' of a communication position of two first oil passage holes 2140 of the two adjacent lamination stacks 214. With this arrangement, when oil flows from the first oil passage hole 2140 of the left lamination stack 214 into the first oil passage hole 2140 of the right lamination stack 214, since the communication area S' becomes smaller, the oil is subject to resistance in the process of circulation, and may make contact with a peripheral part A of the first oil passage hole 2140 of the right lamination stack 214. In this way, the contact area between the oil and the right lamination stack 214 is increased, and a heat exchange effect is improved. In the example shown in FIG. 3, a communication area S' of a communication position of every two adjacent first oil passage holes 2140 of the plurality of adjacent lamination stacks 214 becomes smaller, so that the contact area with the oil is further increased.

There is no limit to how the communication area S' becomes smaller. For example, a flow area of the first oil passage hole 2140 of the left lamination stack 214 may be set larger than a flow area of the first oil passage hole 2140 of the right lamination stack 214. For another example, under the condition that the flow areas of the first oil passage holes 2140 of two adjacent lamination stacks 214 are equal, the two adjacent lamination stacks 214 may be rotated relative to each other in the circumferential direction of the stator core 21 by an angle as long as the two first oil passage holes 2140 of the two adjacent lamination stacks 214 may still be kept in communication.

In one example, in order to increase a contact area between oil in the second oil cooling channel 211 and the lamination stacks 214, the same implementation as above may be adopted. Specifically, for at least two adjacent lamination stacks 214 among the plurality of lamination stacks 214, a flow area of the second oil passage hole 2142 of the lamination stack 214 close to the second oil inlet 2110 is larger than a communication area of a communication position of the two second oil passage holes 2142 of the two adjacent lamination stacks 214, which is not repeated here.

Figure 4:
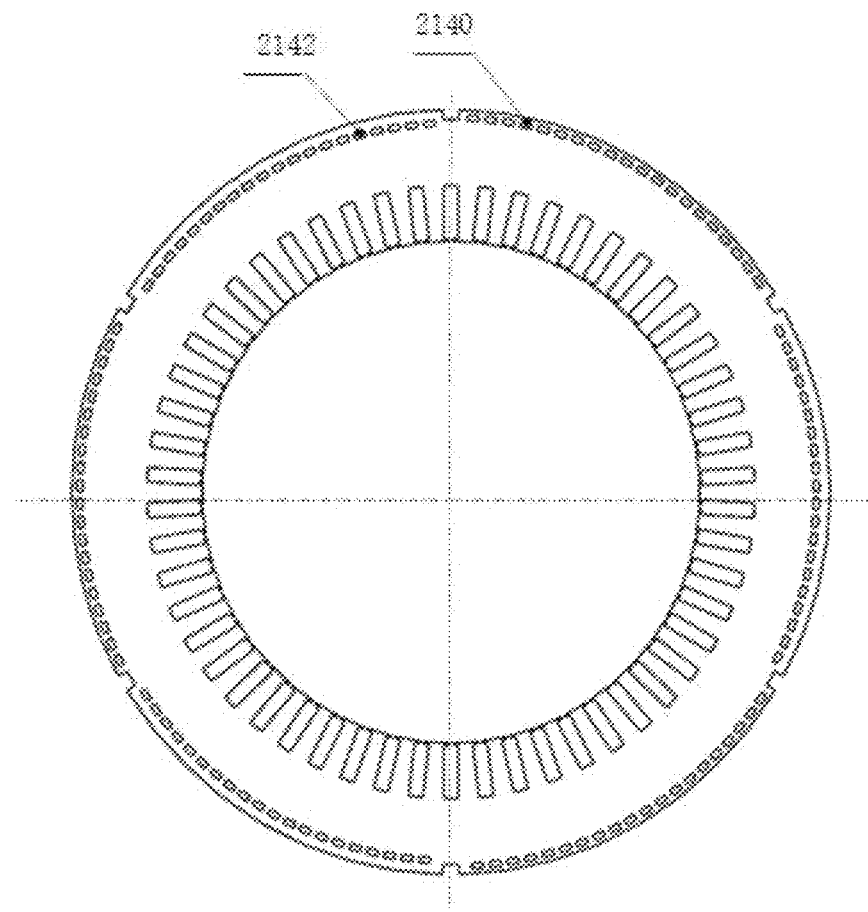
FIG. 4 is an axial view of a first lamination stack illustrated by an example.

Please refer to FIG. 2 and FIG. 4. FIG. 4 illustrates an axial view of a first lamination stack 214'.

In one example, there are three or more lamination stacks 214, including the first lamination stack 214' located at the first end 212 and a second lamination stack 214" located at the second end 213. The first oil inlet 2100 and the second oil outlet 2112 are located in the first lamination stack 214'. The second oil inlet 2110 and the first oil outlet 2102 are located in the second lamination stack 214". The first lamination stack 214' includes a plurality of first laminations stacked in the axial direction. The second lamination stack 214" includes a plurality of second laminations stacked in the axial direction. The first laminations are the same with the second laminations. In this way, the same laminations may be punched by the same mold, which is able to reduce the types of molds and reduce the processing and manufacturing costs of the stator core 21. On the other hand, stacking the first lamination stack 214' and the second lamination stack 214" with the same laminations is beneficial to achieving communication between the plurality of first oil inlets 2100 and the plurality of first oil outlets 2102 in one-to-one correspondence, and communication between the plurality of second oil inlets 2110 and the plurality of second oil outlets 2112 in one-to-one correspondence.

Figure 5:
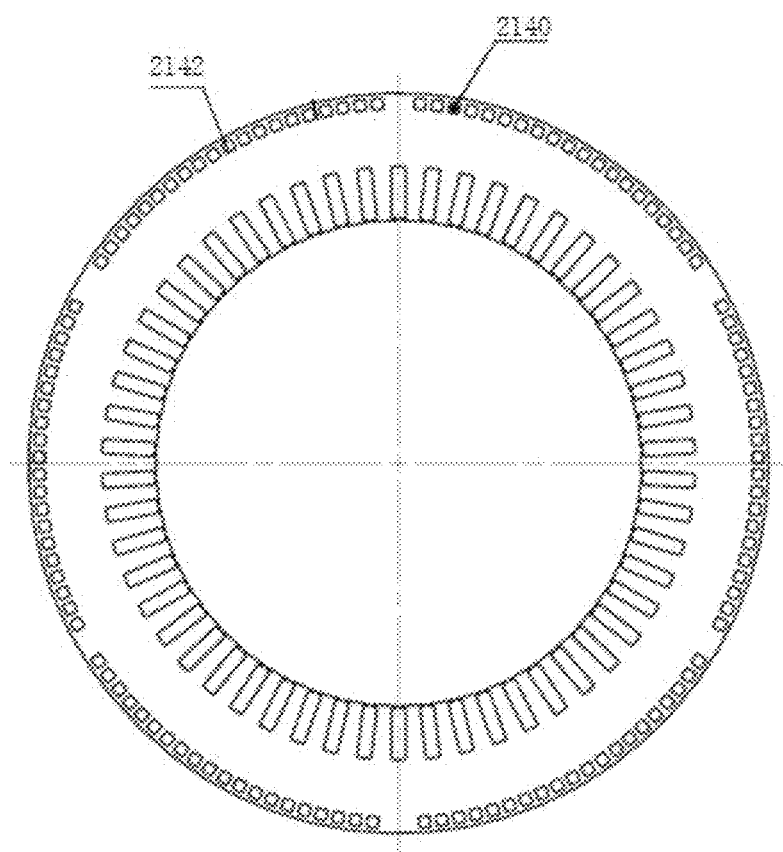
FIG. 5 is an axial view of a third lamination stack illustrated by an example.

Please refer to FIG. 2 and FIG. 5. FIG. 5 illustrates an axial view of a third lamination stack 214'''.

The plurality of lamination stacks 214 further include a plurality of third lamination stacks 214''' located between the first lamination stack 214' and the second lamination stack 214". In at least two adjacent third lamination stacks 214''', the first oil passage hole 2140 in one third lamination stack and the first oil passage hole 2140 in the other third lamination stack are partially staggered in the circumferential direction of the stator core 21. In this way, the communication area S' in FIG. 3 may be reduced. In this solution, while reduction of the communication area S' is achieved, the two adjacent first oil passage holes 2140 may be partially staggered in the circumferential direction merely by rotating the two adjacent third lamination stacks 214''' relatively in the circumferential direction and then stacking the third lamination stacks, and there is no need to change a size of the first oil passage hole 2140 in each third lamination stack 214''', so that a plurality of laminations in the third lamination stack 214''' may be the same, and the processing and manufacturing costs are reduced.

It is certain that in the at least two adjacent third lamination stacks 214''', the second oil passage hole 2142 in one third lamination stack and the second oil passage hole 2142 in the other third lamination stack may be partially staggered in the circumferential direction of the stator core 21. In this solution, while reduction of the communication area S' is achieved, the two adjacent second oil passage holes 2142 may be partially staggered in the circumferential direction merely by rotating the two adjacent third lamination stacks 214''' relatively in the circumferential direction and then stacking the third lamination stacks, and there is no need to change a size of the second oil passage hole 2142 in each third lamination stack 214''', so that a plurality of laminations in the third lamination stack 214''' may be the same, and the processing and manufacturing costs are reduced.

In one example, an opening area of the first oil passage holes 2140 of the third lamination stacks 214''' may be larger than that of the first oil passage holes 2140 of the first lamination stack 214' and that of the second lamination stack 214''. In this way, a relatively large communication area S' may still be ensured when two adjacent third lamination stacks 214''' are staggered in the circumferential direction, resistance in the flow process is reduced, and flow is increased. The quantity and distribution of the first oil passage holes 2140 in the third lamination stacks 214''' may be set corresponding to that of the first oil passage holes 2140 in the first lamination stack 214' and that of the second lamination stack 214''.

In one example, an opening area of the second oil passage holes 2142 of the third lamination stacks 214''' may be larger than that of the second oil passage holes 2142 the first lamination stack 214' and that of the second lamination stack 214''. In this way, a relatively large communication area S' may still be ensured when two adjacent third lamination stacks 214''' are staggered in the circumferential direction, resistance in the flow process is reduced, and flow is increased. The quantity and distribution of the second oil passage holes 2142 in the third lamination stacks 214''' may be set corresponding to that of the first oil passage holes 2142 in the first lamination stack 214' and the second lamination stack 214''.

Figure 6:
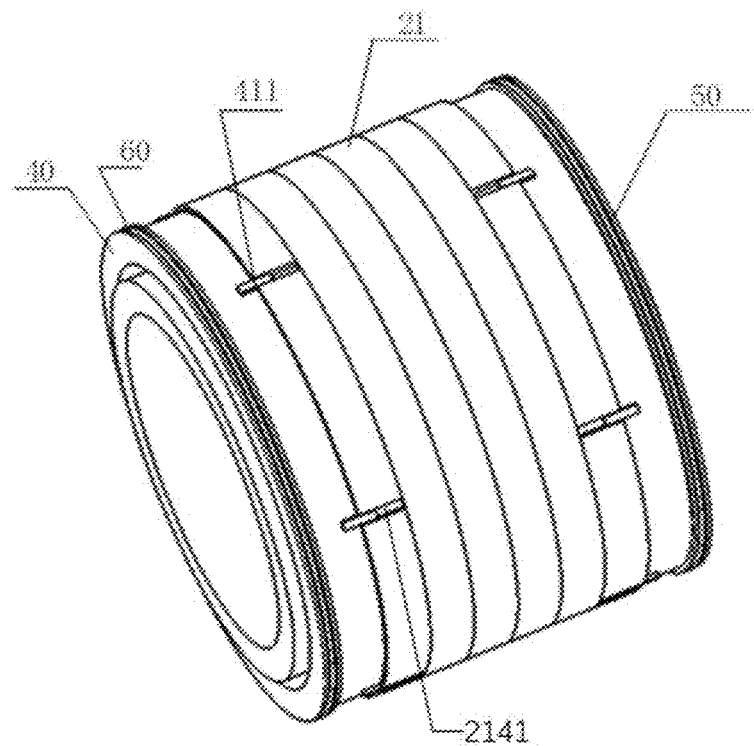
FIG. 6 is a schematic diagram of a stator core assembled with a first cooling oil ring and a second cooling oil ring.
Figure 7:
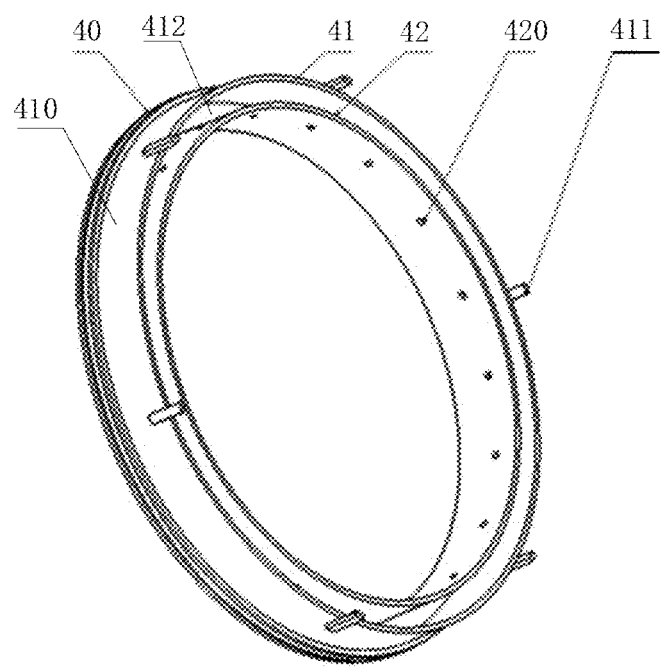
FIG. 7 is a schematic diagram of a first cooling oil ring illustrated by an example of the present application.
Figure 8:
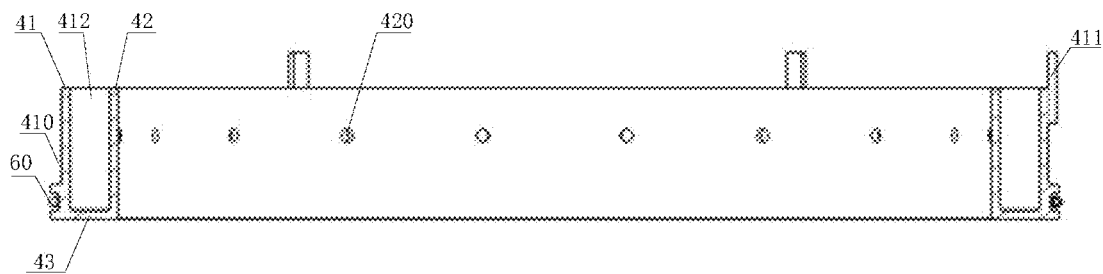
FIG. 8 is a cross-sectional view of a first cooling oil ring shown in FIG. 7.

Please refer to FIG. 1, FIG. 6 to FIG. 8. FIG. 6 is a schematic diagram of the stator core assembled with a first cooling oil ring 40 and a second cooling oil ring 50. FIG. 7 is a schematic diagram of the first cooling oil ring 40 illustrated by an example of the present application. FIG. 8 is a cross-sectional view of the first cooling oil ring 40 shown in FIG. 7.

In one example, the oil-cooled motor 1 further includes the first cooling oil ring 40. The first cooling oil ring 40 is disposed in the accommodating cavity 101 and is fixedly connected to the first end 212 of the stator core 21. The specific connection manner is not limited. For example, a first fixing buckle 411 may be disposed on a first spacer ring 41. The first fixing buckle 411 protrudes in the axial direction. The first fixing buckle 411 may be buckled into a clamping groove 2141 (please refer to FIG. 6) in an outer wall of the first lamination stack 214', and keeps fixed to the stator core 21 in the circumferential direction. The quantity of the first fixing buckles 411 is not limited, and is matched with the quantity of the clamping grooves 2141. The first fixing buckles 411 and the clamping grooves 2141 are engaged in one-to-one correspondence.

The first cooling oil ring 40 may space the first oil inlet 2100 from the second oil outlet 2112, so that a space communicating with the first oil inlet 2100 is spaced from a space communicating with the second oil outlet 2112. In this way, oil may flow directionally. Specifically, the first cooling oil ring 40 includes the first spacer ring 41 disposed coaxially with the rotor 30. A radius of the first spacer ring 41 is larger than a radial dimension of the second oil outlet 2112 from an axis of the rotor 30, and smaller than a radial dimension of the first oil inlet 2100 from the axis of the rotor 30, and the first spacer ring 41 abuts against the first end 212 in the axial direction. In this way, the first oil inlet 2100 is spaced from the second oil outlet 2112. A peripheral space of the first spacer ring 41 may communicate with the first oil inlet 2100, and an internal space of the first spacer ring 41 may communicate with the second oil outlet 2112. In this way, oil fed into the peripheral space of the first spacer ring 41 may merely enter the first oil inlet 2100, but not the second oil outlet 2112.

It needs to be pointed out that, in order to reduce a radial dimension of the stator core 21, a difference between the radial dimension of the first oil inlet 2100 from the axis of the rotor 30 and the radial dimension of the second oil outlet 2112 from the axis of the rotor 30 may be set relatively small, and in this way, a thickness of the first spacer ring 41 also needs to be set relatively small. However, the smaller the thickness of the first spacer ring 41, the lower the strength.

In this example, in order to ensure the strength of the first spacer ring 41 and to appropriately reduce the radial dimension of the stator core 21, the following solution is adopted: in an orthographic projection in the axial direction of the stator core 21, a projection region of the first spacer ring 41 partially overlaps a projection region of the first oil inlet 2100. That is to say, the first spacer ring 41 is made to block a part of the area of the first oil inlet 2100, so that the first oil inlet 2100 and the second oil outlet 2112 may be closer in the radial direction, and the strength may not be weakened even when the thickness of the first spacer ring 41 is too small. In this way, the purpose of appropriately reducing the radial dimension of the stator core 21 is achieved.

In another example, in the orthographic projection in the axial direction of the stator core 21, the projection region of the first spacer ring 41 partially overlaps with a projection region of the second oil outlet 2112. Or, in the orthographic projection in the axial direction of the stator core 21, the projection region of the first spacer ring 41 partially overlaps with the projection region of the first oil inlet 2100, and further overlaps the projection region of the second oil outlet 2112. In this way, the radial dimension of the stator core 21 may be further reduced on the basis of not weakening the strength of the first spacer ring 41.

Please refer to FIG. 1 and FIG. 8. An outer side of the first spacer ring 41 is sleeved with a first sealing ring 60, and the first sealing ring 60 is clamped between the casing 10 and the first spacer ring 41 for sealing a gap between the first spacer ring 41 and the casing 10. In order to maintain the stability of a position of the first sealing ring 60, a sealing ring accommodating groove 44 may be formed in an outer wall of the first spacer ring 41, and the specific forming manner is not limited.

Please refer to FIG. 1, FIG. 7 and FIG. 8, a first oil inlet groove 410 is formed in an outer surface of the first spacer ring 41, the first oil inlet groove 410 communicates with the first oil inlet 2100, and space in which the first oil inlet groove 410 communicates with the first oil inlet 2100 is sealed by the first sealing ring 60. The first oil inlet groove 410 communicates with the first stator oil inlet 103 and further communicates with the casing oil inlet 102. In this solution, by providing the first oil inlet groove 410 in the outer surface of the first spacer ring 41, oil may enter the first oil inlet 2100 via the space in the first oil inlet groove 410, so that pipeline connection is avoided and the structure is simplified. The first oil inlet groove 410 may be set as an annular groove. The first oil inlet groove 410 extends around the circumferential direction and communicates with the plurality of first oil inlets 2100. In this way, oil may be supplied to the plurality of first oil inlets 2100 at the same time via the first oil inlet groove 410.

In the example shown in FIG. 7 and FIG. 8, the first cooling oil ring 40 further includes a first inner ring 42 disposed coaxially with the rotor 30. The first spacer ring 41 is disposed surrounding an outer side of the first inner ring 42. The first inner ring 42 abuts against the first end 212 in the axial direction of the stator core 21. A first interval 412 is reserved between the first spacer ring 41 and the first inner ring 42. The first interval 412 communicates with the second oil outlet 2112. The first inner ring 42 is provided with a first oil jet hole 420, and the first oil jet hole 420 is aligned with the stator winding 22 (please refer to FIG. 1). In this way, oil flowing out of the second oil outlet 2112 first enters the first interval 412, and then is jetted out from the first oil jet hole 420 in the first inner ring 42, so that a flow path of the oil after flowing out is limited, the oil may exchange heat with the stator winding 22 after exchanging heat with the stator core 21, the stator winding 22 is further cooled, and there is no need to provide a separate oil cooling channel flowing to the stator winding 22, which simplifies the structure of the oil cooling channels and improves the heat dissipation efficiency.

The first cooling oil ring 40 further includes a first connecting plate 43 connecting the first spacer ring 41 and the first inner ring 42. Ends, away from the first end 212, of the first spacer ring 41 and the first inner ring 42 are connected via the first connecting plate 43. It is certain that a connection manner of the first spacer ring 41 and the first inner ring 42 is not limited to this.

The stator winding 22 includes a first winding part 221 protruding from the first end 212 in the axial direction. The first inner ring 42 surrounds an outer side of the first winding part 221. To be more precisely, the first oil jet hole 420 is aligned with the first winding part 221. There may be a plurality of first oil jet holes 420. The plurality of first oil jet holes 420 are distributed around the circumferential direction, and may jet oil to the first winding part 221 at the same time, so that oil flow is increased, and the stator winding 22 is efficiently cooled.

The first cooling oil ring 40 may be formed as an integral structure. In one example, the first cooling oil ring 40 is formed as a plastic part, which may be integrally formed by injection molding, for example, but is not limited to this.

Figure 9:
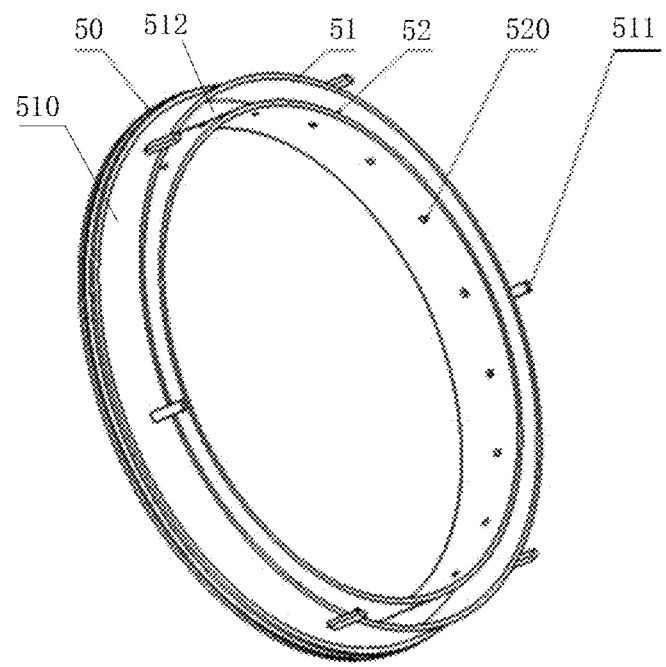
FIG. 9 is a schematic diagram of a second cooling oil ring illustrated by an example.

Please refer to FIG. 1 and FIG. 9. FIG. 9 illustrates a schematic diagram of the second cooling oil ring 50.

In one example, the oil-cooled motor 1 further includes the second cooling oil ring 50. The second cooling oil ring 50 is disposed in the accommodating cavity 101 and is fixedly connected to the second end 213 of the stator core 21. The second cooling oil ring 50 may space the second oil inlet 2110 from the first oil outlet 2102, so that a space communicating with the second oil inlet 2110 is spaced from a space communicating with the first oil outlet 2102. In this way, oil may flow directionally.

In this example, the second cooling oil ring 50 and the first cooling oil ring 40 have the same structure. The second cooling oil ring 50 includes a second spacer ring 51 disposed coaxially with the rotor. A radius of the second spacer ring 51 is larger than a radial dimension of the second oil inlet 2110 from the axis of the rotor 30, and smaller than a radial dimension of the first oil outlet 2102 from the axis of the rotor 30, and the second spacer ring 51 abuts against the second end 213 in the axial direction. In this way, the second oil inlet 2110 is spaced from the first oil outlet 2102.

In one example, in the orthographic projection in the axial direction, a projection region of the second spacer ring 51 partially overlaps with a projection region of the second oil inlet 2110. In another example, in the orthographic projection in the axial direction, the projection region of the second spacer ring 51 partially overlaps with a projection region of the first oil outlet 2102. In this way, the strength of the second spacer ring 51 can be ensured, and the radial dimension of the stator core 21 can be reduced.

In another example, in the orthographic projection in the axial direction of the stator core 21, the projection region of the second spacer ring 51 partially overlaps with the projection region of the second oil inlet 2110, and further overlaps the projection region of the first oil outlet 2102.

The second cooling oil ring 50 further includes a second inner ring 52 disposed coaxially with the rotor 30. The second spacer ring 51 is disposed surrounding an outer side of the second inner ring 52. The second inner ring 52 abuts against the second end 213 in the axial direction. A second interval 512 is reserved between the second spacer ring 51 and the second inner ring 52, and the second interval 512 communicates with the first oil outlet 2102. The second inner ring 52 is provided with a second oil jet hole 520, and the second oil jet hole 520 is aligned with the stator winding 22. Ends, away from the second end 213 of the second spacer ring 51 and the second inner ring 52, are connected via the second connecting plate.

The stator winding 22 includes a second winding part 222 protruding from the second end 213 in the axial direction. The second inner ring 52 surrounds an outer side of the second winding part 222. To be more precise, the second oil jet hole 520 is aligned with the second winding part 222. There may be a plurality of second oil jet holes 520. The plurality of second oil jet holes 520 are distributed around the circumference, i.e., in a circumferential direction, and may jet oil to the second winding part 222 at the same time, so that oil flow is increased, and the stator winding 22 is efficiently cooled.

A second oil inlet groove 510 is formed in an outer surface of the second spacer ring 51, and the second oil inlet groove 510 communicates with the second oil inlet 2110. Space in which the second oil inlet groove 510 communicates with the second oil inlet 2110 may be sealed by a second sealing ring. For details, please refer to the setting manner of the first sealing ring 60. The second oil inlet groove 510 communicates with the second stator oil inlet 104 and further communicates with the casing oil inlet 102. The second spacer ring 51 is provided with a second fixing buckle 511, and the second cooling oil ring 50 keeps fixed to the stator core 21 in the circumferential direction via the second fixing buckle 511.

Figure 10:
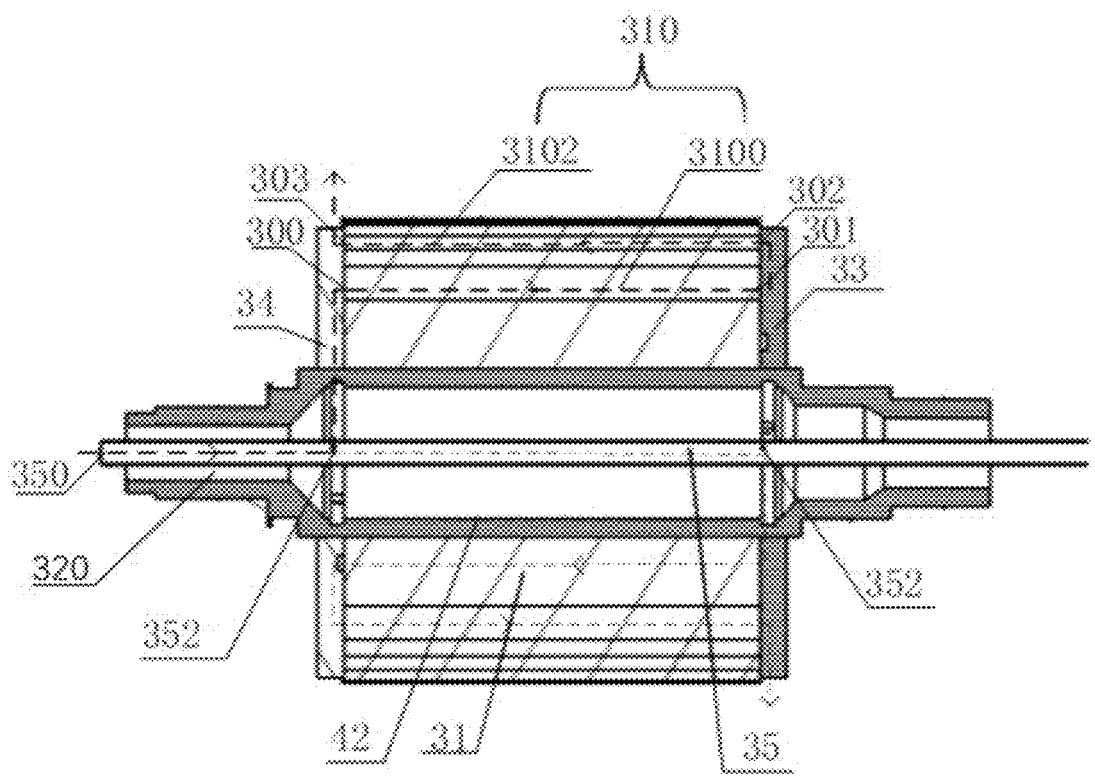
FIG. 10 is a cross-sectional view of a rotor illustrated by an example.

Please refer to FIG. 1 and FIG. 10. FIG. 10 is a cross-sectional view of the rotor 30 illustrated by an example.

The rotor 30 includes a rotor core 31 and a rotating shaft 32. The rotor core 31 is disposed on an outer side of the rotating shaft 32 in a sleeving manner, and is coaxial with the rotating shaft 32 and the stator core 21. The rotating shaft 32 is rotatably assembled to the casing 10, and one end of the rotating shaft 32 extends out of the accommodating cavity 101. The rotor core 31 includes a rotor oil cooling channel 310, and the rotor oil cooling channel 310 is used for feeding and discharging cooling oil so as to achieve cooling of the rotor core 31.

The rotor oil cooling channel 310 includes a third oil cooling channel 3100 and a fourth oil cooling channel 3102. The third oil cooling channel 3100 and the fourth oil cooling channel 3102 penetrate to two axial ends of the rotor core 31. The third oil cooling channel 3100 forms a third oil inlet 300 in one axial end of the rotor core 31, and forms a third oil outlet 301 in the other axial end of the rotor core. The fourth oil cooling channel 3102 forms a fourth oil inlet 302 in one axial end of the rotor core 31, and forms a fourth oil outlet 303 in the other axial end of the rotor core 31. The third oil inlet 300 and the fourth oil outlet 303 are located in the same end. The third oil outlet 301 and the fourth oil inlet 302 are located in the same end, and the third oil outlet 301 communicates with the fourth oil inlet 302. In this solution, the third oil cooling channel 3100 and the fourth oil cooling channel 3102 extend in parallel and communicate with each other inside the rotor core 31, so that a contact area between oil and the rotor core 31 can be increased, and each portion of the rotor core 31 can dissipate heat uniformly.

Figure 11:
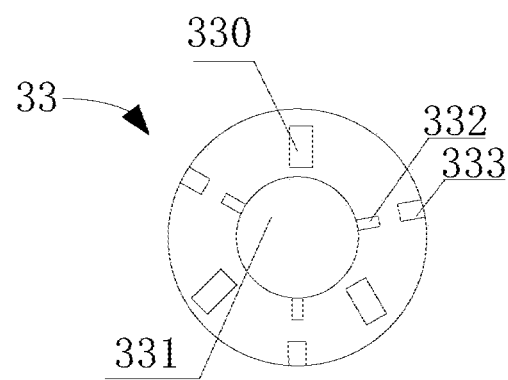
FIG. 11 is a schematic diagram of a first end plate illustrated by an example.

Please refer to FIG. 11. FIG. 11 is a schematic diagram of a first end plate 33 illustrated by an example.

In this example, the rotor 30 further includes the first end plate 33, and the third oil outlet 301 and the fourth oil inlet 302 communicate with each other via the first end plate 33. Specifically, the first end plate 33 is disposed at one axial end of the rotor core 31, and is disposed at the end where the third oil outlet 301 and the fourth oil inlet 302 are located. A surface of a side, facing the rotor core 31, of the first end plate 33 is provided with a first communication groove 330. The first communication groove 330 communicates with the third oil outlet 301 and the fourth oil inlet 302. With this arrangement, the use of connecting oil pipes may be avoided, so that the structure of the rotor 30 may be more compact. It is certain that in some other examples, the third oil outlet 301 and the fourth oil inlet 302 may communicate with each other via a connecting oil pipe.

Figure 12:
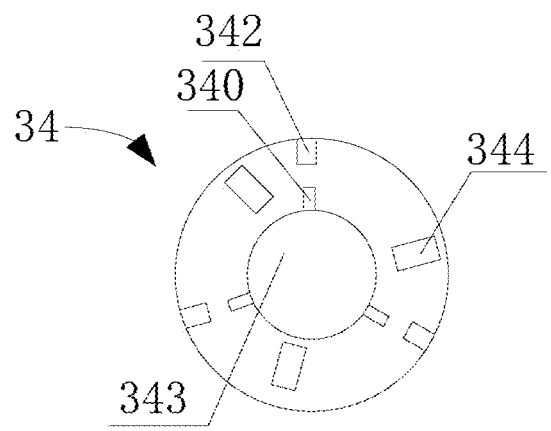
FIG. 12 is a schematic diagram of a second end plate illustrated by an example.

Please refer to FIG. 11 and FIG. 12. FIG. 12 is a schematic diagram of a second end plate 34 illustrated by an example.

In one example, the rotor 30 further includes the second end plate 34, and the second end plate 34 is disposed at one axial end of the rotor core 31, and is disposed at the end where the third oil inlet 300 and the fourth oil outlet 303 are located. A rotor oil inlet 350 may communicate with the third oil inlet 300 via the second end plate 34, so as to supply oil to the third oil cooling channel 3100. A rotor oil outlet 350 may communicate with the fourth oil outlet 303 via the second end plate 34, so that oil may flow out of the fourth oil cooling channel 3102.

Specifically, a surface of a side, facing the rotor core 31, of the second end plate 34 is provided with a first oil inlet groove 340 and a first oil outlet groove 342. The rotor 30 is provided with the rotor oil inlet 350 for supplying oil to the rotor 30 from the outside and the rotor oil outlet for conveying oil from the rotor 30 to the outside. One end of the first oil inlet groove 340 communicates with the rotor oil inlet 350, and the other end of the first oil inlet groove 340 communicates with the third oil inlet 300. One end of the first oil outlet groove 342 communicates with the fourth oil outlet 303, and the other end of the first oil outlet groove 342 communicates with the rotor oil outlet. In this way, the rotor oil inlet 350 may communicate with the third oil inlet 300 without using an oil pipe, and the fourth oil outlet 303 may communicate with the rotor oil outlet without using an oil pipe, so that the structure is simpler and more compact. In this example, an opening in an outer end of the first oil outlet groove 342 is set as the rotor oil outlet.

Figure 13:
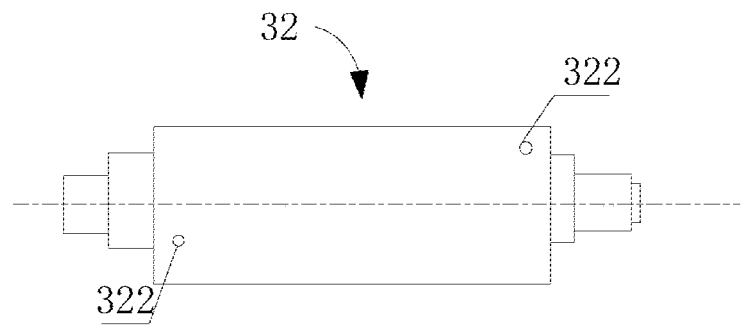
FIG. 13 is a schematic diagram of a rotating shaft.

Please refer to FIG. 10 and FIG. 13. FIG. 13 illustrates a schematic diagram of a rotating shaft 32.

In one example, the rotating shaft 32 is of a hollow structure, and the rotating shaft 32 includes an oil storage cavity 320 located in a hollow position and an oil throwing port 322 disposed in a side wall. The oil throwing port 322 directly faces the first oil inlet groove 340, and communicates the oil storage cavity 320 with the first oil inlet groove 340. The rotor 30 further includes an oil jet pipe 35 disposed in the rotating shaft 32. One end of the oil jet pipe 35 is the rotor oil inlet 350, and the rotor oil inlet 350 communicates with the casing oil inlet 102. An oil jet port 352 is further disposed in a pipe wall of the oil jet pipe 35. The oil jet port 352 directly faces the oil throwing port 322 and communicates the rotor oil inlet 350 with the oil storage cavity 320. The oil jet pipe 35 may jet oil directionally, so that more oil may be accumulated at the oil throwing port 322. When the rotor 30 rotates, oil is thrown out from the oil throwing port 322 under the action of centrifugal force, enters the first oil inlet groove 340, and then enters the third oil inlet 300.

Figure 14:
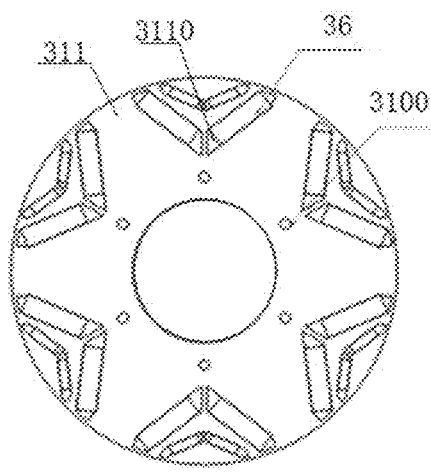
FIG. 14 is an axial view of magnet steel assembled to a stator core.

Please refer to FIG. 14. FIG. 14 is an axial view of magnet steel 36 assembled to the stator core 31.

The rotor core 31 includes a plurality of rotor lamination stacks 311 stacked in the axial direction, and each rotor lamination stack 311 is formed by stacking a plurality of identical laminations. The quantity of the rotor lamination stacks 311 is not limited, and the quantity of laminations in each rotor lamination stack 311 is not limited.

The rotor 30 further includes a plurality of pieces of magnetic steel 36, and the magnetic steel 36 is installed in each rotor lamination stack 311. Specifically, each rotor lamination stack 311 is provided with a magnetic steel accommodating groove 3110. The plurality of pieces of magnetic steel 36 are disposed in the magnetic steel accommodating grooves 3110 one by one. Each rotor lamination stack 311 may be provided with a plurality of magnetic steel accommodating grooves 3110 for installing a plurality of pieces of magnetic steel 36. In addition, the magnetic steel accommodating grooves 3110 of each rotor lamination stack 311 communicate with one another in sequence in the axial direction to form the third oil cooling channel 3100 or the fourth oil cooling channel 3102 together (please refer to FIG. 10). In this way, oil may also make contact with the magnetic steel 36 to dissipate heat from the magnetic steel 36, so that the temperature of the magnetic steel 36 is prevented from being too high. In this example, the magnetic steel accommodating grooves 3110 communicate with one another in sequence to form the fourth oil cooling channel 3102 together.

In order to increase the heat dissipation area of the rotor core 31 and improve the heat dissipation efficiency, the rotor core 31 may be provided with a plurality of groups of rotor oil cooling channels 310. In one example, the plurality of groups of rotor oil cooling channels 310 at least include two groups, namely a first rotor oil cooling channel and a second rotor oil cooling channel. A third oil inlet 300 of the first rotor oil cooling channel and a third oil inlet 300 of the second rotor oil cooling channel are located at different axial ends of the rotor core 31. A fourth oil outlet 303 of the first rotor oil cooling channel I and a fourth oil outlet 303 of the second rotor oil cooling channel are located at different axial ends of the rotor core 31. In this way, oil may flow into the rotor core 31 via the third oil inlet 300 of the first rotor oil cooling channel, further may flow into the rotor core 31 via the third oil inlet 300 of the second rotor oil cooling channel, and the oil flows in opposite directions (the specific oil flow direction is shown by the dashed arrow in FIG. 10), so that the heat dissipation efficiency and heat dissipation uniformity of the rotor core 31 can be improved. In the example shown in FIG. 10, the third oil inlet 300 of the first rotor oil cooling channel faces the second end plate 34, and the third oil inlet 300 of the second rotor oil cooling channel faces the first end plate 33.

In the example shown in FIG. 11, the first end plate 33 is set to be of a circular structure, and a first through hole 331 is disposed in the middle for the rotating shaft 32 to pass through. The first end plate 33 may be coaxial with the rotating shaft 32. The first end plate 33 is fixedly connected to the rotor core 31, and a connection manner is not limited.

The surface of the side, with the first communication groove 330, of the first end plate 33 is further provided with a second oil inlet groove 332 and a second oil outlet groove 333. One end of the second oil inlet groove 332 communicates with the rotor oil inlet 350, and the other end of the second oil inlet groove 332 communicates with the third oil inlet 300 of the second rotor oil cooling channel. One end of the second oil outlet groove 333 communicates with the fourth oil outlet 303 of the second rotor oil cooling channel, and the other end of the second oil outlet groove 333 communicates with the rotor oil outlet. In this example, an opening in an outer end of the second oil outlet groove 333 is also the rotor oil outlet for allowing oil in the second rotor oil cooling channel to flow out of the rotor 30.

In the example shown in FIG. 12, the second end plate 34 is set to be of a circular structure, and a second through hole 343 is disposed in the middle for the rotating shaft 32 to pass through. The second end plate 34 may be coaxial with the rotating shaft 32. The second end plate 34 is fixedly connected to the rotor core 31, and a connection manner is not limited.

The surface of the side, with the first oil inlet groove 340 and the first oil outlet groove 342, of the second end plate 34 is further provided with a second communication groove 344. The second communication groove 344 communicates with a third oil outlet 301 and a fourth oil inlet 302 of the second rotor oil cooling channel.

It needs to be noted that, in an example with a plurality of groups of first rotor oil cooling channels and second rotor oil cooling channels, the first end plate 33 may be provided with a plurality of groups of first communication grooves 330, second oil inlet grooves 332 and second oil outlet grooves 333, and the second end plate 34 may be provided with a plurality of groups of first oil inlet grooves 340, first oil output grooves 342 and second communication grooves 344. Correspondingly, the rotating shaft 32 may be provided with a plurality of oil throwing ports 322, and the oil jet pipe 35 may be provided with a plurality of oil jet ports 352.

In one example, the rotor oil outlet of the rotor 30 may directly face the stator winding 22. In this way, oil conveyed out of the rotor 30 may also flow to the stator winding 22 for cooling the stator winding 22. In this example, the first winding part 221 surrounds a periphery of the second end plate 34, the second winding part 222 surrounds a periphery of the first end plate 33, the second oil outlet groove 333 of the first end plate 33 directly faces the second winding part 222, the first oil outlet groove 342 of the second end plate 34 directly faces the first winding part 221, and a plurality of portions of the stator winding 22 are cooled at the same time.

The casing 10 further includes a casing oil outlet (not shown). The casing oil outlet communicates with the accommodating cavity 101. Oil dripping from the stator winding 22 may flow out from the casing oil outlet.

EMBODIMENTS

A first embodiment includes an oil-cooled motor, includes:
 a casing, internally provided with an accommodating cavity;
 a rotor, accommodated in the accommodating cavity; and
 a stator, accommodated in the accommodating cavity, in which the stator includes a stator core coaxially surrounding an outer side of the rotor, the stator core includes a first oil cooling channel, a second oil cooling channel, and a first end and a second end in an axial direction of the rotor, the first oil cooling channel penetrates the stator core from the first end to the second end, forming a first oil inlet in the first end and forming a first oil outlet in the second end, and the second oil cooling channel penetrates the stator core from the first end to the second end, forming a second oil inlet in the second end and forming a second oil outlet in the first end.

A second embodiment includes the oil-cooled motor of the first embodiment, in which the stator core includes a plurality of lamination stacks stacked in an axial direction, each lamination stack is provided with axially through-extending first oil passage holes and axially through-extending second oil passage holes, the first oil passage holes communicate with one another in sequence to form the first oil cooling channel, and the second oil passage holes communicate with one another in sequence to form the second oil cooling channel; wherein the plurality of lamination stacks are configured as at least one of the following:
 in at least two adjacent lamination stacks, a flow area of the first oil passage hole of the lamination stack close to the first oil inlet is larger than a communication area of a communication position of two first oil passage holes of the two adjacent lamination stacks; and
 in at least two adjacent lamination stacks, a flow area of the second oil passage hole of the lamination stack close to the second oil inlet is larger than a communication area of a communication position of two second oil passage holes of the two adjacent lamination stacks.

A third embodiment includes the oil-cooled motor of the second embodiment, in which there are at least three lamination stacks, included a first lamination stack located at the first end, a second lamination stack located at the second end, and one or more a third lamination stack located between the first lamination stack and the second lamination stack, the first oil inlet and the second oil outlet are located in the first lamination stack, the second oil inlet and the first oil outlet are located in the second lamination stack, the first lamination stack includes a plurality of first laminations stacked in the axial direction, the second lamination stack includes a plurality of second laminations stacked in the axial direction, and the first laminations are substantially identical to the second laminations.

A fourth embodiment includes the oil-cooled motor of the third embodiment, in which there are a plurality of third lamination stacks, in which at least two adjacent third lamination stacks are configured as at least one of the following:

the first oil passage hole in one third lamination stack and the first oil passage hole in the other third lamination stack are partially staggered in a circumferential direction of the stator core, and the second oil passage hole in one third lamination stack and the second oil passage hole in the other third lamination stack are partially staggered in the circumferential direction of the stator core.

A fifth embodiment includes the oil-cooled motor any one of the first to fourth embodiments, in which further includes a first cooling oil ring disposed at the first end, in which the first cooling oil ring includes a first spacer ring disposed coaxially with the rotor, a radius of the first spacer ring is larger than a radial dimension of the second oil outlet from an axis of the rotor, and smaller than a radial dimension of the first oil inlet from the axis of the rotor, and the first spacer ring abuts against the first end in the axial direction, and isolates the first oil inlet from the second oil outlet.

A sixth embodiment includes the oil-cooled motor of the fifth embodiment, in which the first spacer ring is configured as at least one of the following:
   an orthographic projection in the axial direction, a projection region of the first spacer ring partially overlaps a projection region of the first oil inlet; and
   in the orthographic projection in the axial direction, the projection region of the first spacer ring partially overlaps a projection region of the second oil outlet.

A seventh embodiment includes the oil-cooled motor of the fifth embodiment, further includes a stator winding disposed on the stator core, in which the first cooling oil ring further includes a first inner ring disposed coaxially with the rotor, the first spacer ring is disposed surrounding an outer side of the first inner ring, the first inner ring abuts against the first end in the axial direction, a first interval is reserved between the first spacer ring and the first inner ring, the first interval communicates with the second oil outlet, in which the first cooling oil ring is configured as at least one of the following:
   a first oil jet hole is formed on the first inner ring, and the first oil jet hole is aligned with the stator winding; and
   a first oil inlet groove is formed in an outer surface of the first spacer ring, and the first oil inlet groove communicates with the first oil inlet.

An eighth embodiment includes the oil-cooled motor any one of the first to fourth embodiments, further includes a second cooling oil ring disposed at the second end, in which the second cooling oil ring includes a second spacer ring disposed coaxially with the rotor, a radius of the second spacer ring is larger than a radial dimension of the first oil outlet from the axis of the rotor, and smaller than a radial dimension of the second oil inlet from the axis of the rotor, and the second spacer ring abuts against the second end in the axial direction, and isolates the second oil inlet from the first oil outlet.

A ninth embodiment includes the oil-cooled motor of the eighth embodiment, in which the second spacer ring is configured as at least one of the following:
   in an orthographic projection in the axial direction, a projection region of the second spacer ring partially overlaps a projection region of the second oil inlet; and
   in the orthographic projection in the axial direction, the projection region of the second spacer ring partially overlaps a projection region of the first oil outlet.

A tenth embodiment includes the oil-cooled motor of the eighth embodiment, further includes a stator winding disposed on the stator core, in which the second cooling oil ring further includes a second inner ring disposed coaxially with the rotor, the second spacer ring is disposed surrounding an outer side of the second inner ring, the second inner ring abuts against the second end in the axial direction, a second interval is reserved between the second spacer ring and the second inner ring, the second interval communicates with the first oil outlet, in which the second cooling oil ring is configured as at least one of the following:
   a second oil jet hole is formed on the second inner ring, and the second oil jet hole is aligned with the stator winding; and
   a second oil inlet groove is formed in an outer surface of the second spacer ring, and the second oil inlet groove communicates with the second oil inlet.

An eleventh embodiment includes the oil-cooled motor any one of the first to fourth, sixth, seventh, ninth, tenth embodiments, in which the casing is provided with a casing oil inlet, and the casing oil inlet communicates with the first oil inlet and the second oil inlet;
   the stator core is configured as at least one of the following:
   the stator core includes a plurality of first oil cooling channels disposed in parallel, the plurality of first oil cooling channels form a plurality of first oil inlets in the first end, and form a plurality of first oil outlets in the second end, and the plurality of first oil inlets communicate with the plurality of first oil outlets in a one-to-one correspondence mode; and
   the stator core includes a plurality of second oil cooling channels disposed in parallel, the plurality of second oil cooling channels form a plurality of second oil outlets in the first end, and form a plurality of second oil inlets in the second end, and the plurality of second oil inlets communicate with the plurality of second oil outlets in a one-to-one correspondence mode.

A twelfth embodiment includes the oil-cooled motor of the first embodiment, in which the rotor includes a rotor core disposed coaxially with the stator core, the rotor core includes a rotor oil cooling channel, the rotor oil cooling channel includes a third oil cooling channel and a fourth oil cooling channel respectively penetrated through two axial ends of the rotor core; in which the third oil cooling channel forms a third oil inlet in one axial end of the rotor core, and forms a third oil outlet in the other axial end of the rotor core, the fourth oil cooling channel forms a fourth oil inlet in one axial end of the rotor core, and forms a fourth oil outlet in the other axial end of the rotor core; in which the third oil inlet and the fourth oil outlet are located in the same end, the third oil outlet and the fourth oil inlet are located in the same end, and the third oil outlet communicates with the fourth oil inlet.

A thirteenth embodiment includes the oil-cooled motor of the twelfth embodiment, in which the rotor further includes a first end plate, the first end plate is disposed at one axial end of the rotor core and is disposed at the end where the third oil outlet and the fourth oil inlet are located, a surface of a side, facing the rotor core, of the first end plate is provided with a first communication groove, and the first communication groove communicates with the third oil outlet and the fourth oil inlet.

A fourteenth embodiment includes the oil-cooled motor of the thirteenth embodiment, in which the rotor further includes a second end plate, the second end plate is disposed at one axial end of the rotor core and is disposed at the end where the third oil inlet and the fourth oil outlet are located, a surface of a side, facing the rotor core, of the second end plate is provided with a first oil inlet groove and a first oil outlet groove, the rotor is further provided with a rotor oil inlet for supplying oil to the rotor and a rotor oil outlet for conveying oil from the rotor to the outside, the first oil inlet groove communicates with the rotor oil inlet and the third oil inlet, and the first oil outlet groove communicates with the fourth oil outlet and the rotor oil outlet.

A fifteenth embodiment includes the oil-cooled motor of the fourteenth embodiment, in which the rotor further includes a rotating shaft of a hollow structure, the rotating shaft includes an oil storage cavity located in a hollow position and an oil throwing port disposed in a side wall, the oil throwing port communicates the oil storage cavity with the first oil inlet groove, the rotor further includes an oil jet pipe disposed in the rotating shaft and coaxially with the rotating shaft, one end of the oil jet pipe is provided with the rotor oil inlet, an oil jet port is disposed in a pipe wall of the oil jet pipe, and the oil jet port communicates with the rotor oil inlet and the oil storage cavity.

A sixteenth embodiment includes the oil-cooled motor of the fourteenth embodiment, in which the rotor core is provided with a plurality of groups of rotor oil cooling channels, the plurality of groups of rotor oil cooling channels at least include a first rotor oil cooling channel and a second rotor oil cooling channel, a third oil inlet of the first rotor oil cooling channel and a third oil inlet of the second rotor oil cooling channel are located at different axial ends of the rotor core, and a fourth oil outlet of the first rotor oil cooling channel and a fourth oil outlet of the second rotor oil cooling channel are located at different axial ends of the rotor core.

A seventeenth embodiment includes the oil-cooled motor of the fourteenth embodiment, in which the surface of the side, with the first communication groove, of the first end plate is further provided with a second oil inlet groove and a second oil outlet groove, the second oil inlet groove communicates with the rotor oil inlet and a third oil inlet of the second rotor oil cooling channel, and the second oil outlet groove communicates with a fourth oil outlet of the second rotor oil cooling channel and the rotor oil outlet.

An eighteenth embodiment includes the oil-cooled motor of the fourteenth embodiment, in which the surface of the side, with the first oil inlet groove and the first oil outlet groove, of the second end plate is further provided with a second communication groove, and the second communication groove communicates with a third oil outlet of the second rotor oil cooling channel and a fourth oil inlet of the second rotor oil cooling channel.

A nineteenth embodiment includes the oil-cooled motor of the fourteenth embodiment, further includes a stator winding disposed on the stator core, and the rotor oil outlet directly faces the stator winding.

A twenty embodiment includes the oil-cooled motor any one of the twelfth to nineteenth embodiments, in which the rotor core includes a plurality of rotor lamination stacks stacked in the axial direction, each rotor lamination stack is provided with a magnetic steel accommodating groove, the magnetic steel accommodating grooves communicate with one another in sequence in the axial direction to form the third oil cooling channel or the fourth oil cooling channel together, the rotor further includes a plurality of pieces of magnetic steel, and the plurality of pieces of magnetic steel are disposed in the magnetic steel accommodating grooves one by one.

What is claimed is:

1. An oil-cooled motor, comprising:
    a casing, internally provided with an accommodating cavity;
    a rotor, accommodated in the accommodating cavity; and
    a stator, accommodated in the accommodating cavity, wherein the stator comprises a stator core coaxially surrounding an outer side of the rotor, wherein the stator core comprises:
    a first oil cooling channel,
    a second oil cooling channel, and
    a first end and a second end in an axial direction of the rotor,
    wherein the first oil cooling channel penetrates the stator core from the first end to the second end, forming a first oil inlet in the first end and forming a first oil outlet in the second end, and the second oil cooling channel penetrates the stator core from the first end to the second end, forming a second oil inlet in the second end and forming a second oil outlet in the first end;
    wherein the stator core comprises a plurality of lamination stacks stacked in an axial direction, each lamination stack is provided with axially through-extending first oil passage holes and axially through-extending second oil passage holes, the first oil passage holes communicate with one another in sequence to form the first oil cooling channel, and the second oil passage holes communicate with one another in sequence to form the second oil cooling channel; wherein the plurality of lamination stacks are configured as at least one of the following:
    in at least two adjacent lamination stacks, a flow area of the first oil passage hole of the lamination stack close to the first oil inlet is larger than a communication area of a communication position of two first oil passage holes of the two adjacent lamination stacks; and
    in at least two adjacent lamination stacks, a flow area of the second oil passage hole of the lamination stack close to the second oil inlet is larger than a communication area of a communication position of two second oil passage holes of the two adjacent lamination stacks.

2. The oil-cooled motor according to claim 1, wherein there are three or more lamination stacks, comprising a first lamination stack located at the first end, a second lamination stack located at the second end, and one or more a third lamination stack located between the first lamination stack and the second lamination stack, the first oil inlet and the second oil outlet are located in the first lamination stack, the second oil inlet and the first oil outlet are located in the second lamination stack, the first lamination stack comprises a plurality of first laminations stacked in the axial direction, the second lamination stack comprises a plurality of second laminations stacked in the axial direction, and the first laminations are identical to the second laminations.

3. The oil-cooled motor according to claim 2, wherein there are a plurality of third lamination stacks, wherein at least two adjacent third lamination stacks are configured as at least one of the following:
    the first oil passage hole in one third lamination stack and the first oil passage hole in the other third lamination stack are partially staggered in a circumferential direction of the stator core; and
    the second oil passage hole in one third lamination stack and the second oil passage hole in the other third lamination stack are partially staggered in the circumferential direction of the stator core.

4. The oil-cooled motor according to claims 1, further comprising a first cooling oil ring disposed at the first end, wherein the first cooling oil ring comprises a first spacer ring disposed coaxially with the rotor, a radius of the first spacer ring is larger than a radial dimension of the second oil outlet from an axis of the rotor, and smaller than a radial dimension of the first oil inlet from the axis of the rotor, and the first spacer ring abuts against the first end in the axial direction, and isolates the first oil inlet from the second oil outlet.

5. The oil-cooled motor according to claim 4, wherein the first spacer ring is configured as at least one of the following:
in an orthographic projection in the axial direction, a projection region of the first spacer ring partially overlaps a projection region of the first oil inlet; and
in the orthographic projection in the axial direction, the projection region of the first spacer ring partially overlaps a projection region of the second oil outlet.

6. The oil-cooled motor according to claim 4, further comprising a stator winding disposed on the stator core, wherein the first cooling oil ring further comprises a first inner ring disposed coaxially with the rotor, the first spacer ring is disposed surrounding an outer side of the first inner ring, the first inner ring abuts against the first end in the axial direction, a first interval is reserved between the first spacer ring and the first inner ring, the first interval communicates with the second oil outlet, wherein the first cooling oil ring is configured as at least one of the following:
a first oil jet hole is formed in the first inner ring, and the first oil jet hole is aligned with the stator winding; and
a first oil inlet groove is formed in an outer surface of the first spacer ring, and the first oil inlet groove communicates with the first oil inlet.

7. The oil-cooled motor according to claims 1, further comprising a second cooling oil ring disposed at the second end, wherein the second cooling oil ring comprises a second spacer ring disposed coaxially with the rotor, a radius of the second spacer ring is larger than a radial dimension of the first oil outlet from the axis of the rotor, and smaller than a radial dimension of the second oil inlet from the axis of the rotor, and the second spacer ring abuts against the second end in the axial direction, and isolates the second oil inlet from the first oil outlet.

8. The oil-cooled motor according to claim 7, wherein the second spacer ring is configured as at least one of the following:
in an orthographic projection in the axial direction, a projection region of the second spacer ring partially overlaps a projection region of the second oil inlet; and
in the orthographic projection in the axial direction, the projection region of the second spacer ring partially overlaps a projection region of the first oil outlet.

9. The oil-cooled motor according to claim 7, further comprising a stator winding disposed on the stator core, wherein the second cooling oil ring further comprises a second inner ring disposed coaxially with the rotor, the second spacer ring is disposed surrounding an outer side of the second inner ring, the second inner ring abuts against the second end in the axial direction, a second interval is reserved between the second spacer ring and the second inner ring, the second interval communicates with the first oil outlet; wherein the second cooling oil ring is configured as at least one of the following:
a second oil jet hole is formed on the second inner ring, and the second oil jet hole is aligned with the stator winding; and
a second oil inlet groove is formed on an outer surface of the second spacer ring, and the second oil inlet groove communicates with the second oil inlet.

10. The oil-cooled motor according to claims 1, wherein the casing is provided with a casing oil inlet, and the casing oil inlet communicates with the first oil inlet and the second oil inlet; and
the stator core is configured as at least one of the following:
the stator core comprises a plurality of first oil cooling channels disposed in parallel, the plurality of first oil cooling channels form a plurality of first oil inlets in the first end, and form a plurality of first oil outlets in the second end, and the plurality of first oil inlets communicate with the plurality of first oil outlets in a one-to-one correspondence mode; and
the stator core comprises a plurality of second oil cooling channels disposed in parallel, the plurality of second oil cooling channels form a plurality of second oil outlets in the first end, and form a plurality of second oil inlets in the second end, and the plurality of second oil inlets communicate with the plurality of second oil outlets in a one-to-one correspondence mode.

11. The oil-cooled motor according to claim 1, wherein the rotor comprises a rotor core disposed coaxially with the stator core, the rotor core comprises a rotor oil cooling channel, the rotor oil cooling channel comprises a third oil cooling channel and a fourth oil cooling channel respectively penetrated through two axial ends of the rotor core; wherein the third oil cooling channel forms a third oil inlet in one axial end of the rotor core, and forms a third oil outlet in the other axial end of the rotor core, the fourth oil cooling channel forms a fourth oil inlet in one axial end of the rotor core, and forms a fourth oil outlet in the other axial end of the rotor core; wherein the third oil inlet and the fourth oil outlet are located in the same end, the third oil outlet and the fourth oil inlet are located in the same end, and the third oil outlet communicates with the fourth oil inlet.

12. The oil-cooled motor according to claim 11, wherein the rotor further comprises a first end plate, the first end plate is disposed at one axial end of the rotor core and is disposed at the end where the third oil outlet and the fourth oil inlet are located, a surface of a side, facing the rotor core, of the first end plate is provided with a first communication groove, and the first communication groove communicates with the third oil outlet and the fourth oil inlet.

13. The oil-cooled motor according to claim 12, wherein the rotor further comprises a second end plate, the second end plate is disposed at one axial end of the rotor core and is disposed at the end where the third oil inlet and the fourth oil outlet are located, a surface of a side, facing the rotor core, of the second end plate is provided with a first oil inlet groove and a first oil outlet groove, the rotor is further provided with a rotor oil inlet for supplying oil to the rotor and a rotor oil outlet for conveying oil from the rotor to the outside, the first oil inlet groove communicates with the rotor oil inlet and the third oil inlet, and the first oil outlet groove communicates with the fourth oil outlet and the rotor oil outlet.

14. The oil-cooled motor according to claim 13, wherein the rotor further comprises a rotating shaft of a hollow structure, the rotating shaft comprises an oil storage cavity located in a hollow position and an oil throwing port disposed in a side wall, the oil throwing port communicates the oil storage cavity with the first oil inlet groove, the rotor further comprises an oil jet pipe disposed in the rotating shaft and coaxially with the rotating shaft, one end of the oil jet pipe is provided with the rotor oil inlet, an oil jet port is disposed in a pipe wall of the oil jet pipe, and the oil jet port communicates with the rotor oil inlet and the oil storage cavity.

15. The oil-cooled motor according to claim 13, wherein the rotor core is provided with a plurality of groups of rotor oil cooling channels, the plurality of groups of rotor oil cooling channels at least comprise a first rotor oil cooling channel and a second rotor oil cooling channel, a third oil inlet of the first rotor oil cooling channel and a third oil inlet of the second rotor oil cooling channel are located at different axial ends of the rotor core, and a fourth oil outlet of the first rotor oil cooling channel and a fourth oil outlet of the second rotor oil cooling channel are located at different axial ends of the rotor core.

16. The oil-cooled motor according to claim 13, wherein the surface of the side, with the first communication groove, of the first end plate is further provided with a second oil inlet groove and a second oil outlet groove, the second oil inlet groove communicates with the rotor oil inlet and a third oil inlet of a second rotor oil cooling channel, and the second oil outlet groove communicates with a fourth oil outlet of the second rotor oil cooling channel and the rotor oil outlet.

17. The oil-cooled motor according to claim 13, wherein the surface of the side, with the first oil inlet groove and the first oil outlet groove, of the second end plate is further provided with a second communication groove, and the second communication groove communicates with a third oil outlet of a second rotor oil cooling channel and a fourth oil inlet of the second rotor oil cooling channel.

18. The oil-cooled motor according to claim 13, further comprising a stator winding disposed on the stator core, and the rotor oil outlet directly faces the stator winding.

19. The oil-cooled motor according to claim 11, wherein the rotor core comprises a plurality of rotor lamination stacks stacked in the axial direction, each rotor lamination stack is provided with a magnetic steel accommodating groove, the magnetic steel accommodating grooves communicate with one another in sequence in the axial direction to form the third oil cooling channel or the fourth oil cooling channel together, the rotor further comprises a plurality of pieces of magnetic steel, and the plurality of pieces of magnetic steel are disposed in the magnetic steel accommodating grooves one by one.

\* \* \* \* \*

UNITED STATES PATENT AND TRADEMARK OFFICE
CERTIFICATE OF CORRECTION

PATENT NO. : 12,199,471 B2
APPLICATION NO. : 17/877459
DATED : January 14, 2025
INVENTOR(S) : Wenhui Luo Page 1 of 1

It is certified that error appears in the above-identified patent and that said Letters Patent is hereby corrected as shown below:

In the Specification
In Column 9, Line 46, delete "precisely," and insert -- precise, --, therefor.
In Column 17, Line 51, delete "twenty" and insert -- twentieth --, therefor.

In the Claims
In Column 17, Line 64, delete "Anoil-cooled" and insert -- An oil-cooled --, therefor.
In Column 18, Line 62, delete "claims" and insert -- claim --, therefor.
In Column 19, Line 28, delete "claims" and insert -- claim --, therefor.
In Column 19, Line 64, delete "claims" and insert -- claim --, therefor.

Signed and Sealed this
First Day of April, 2025

Coke Morgan Stewart
*Acting Director of the United States Patent and Trademark Office*